No. 616,638. Patented Dec. 27, 1898.
H. B. SCHULTE.
EVAPORATOR.
(Application filed Jan. 10, 1898.)
(No Model.)
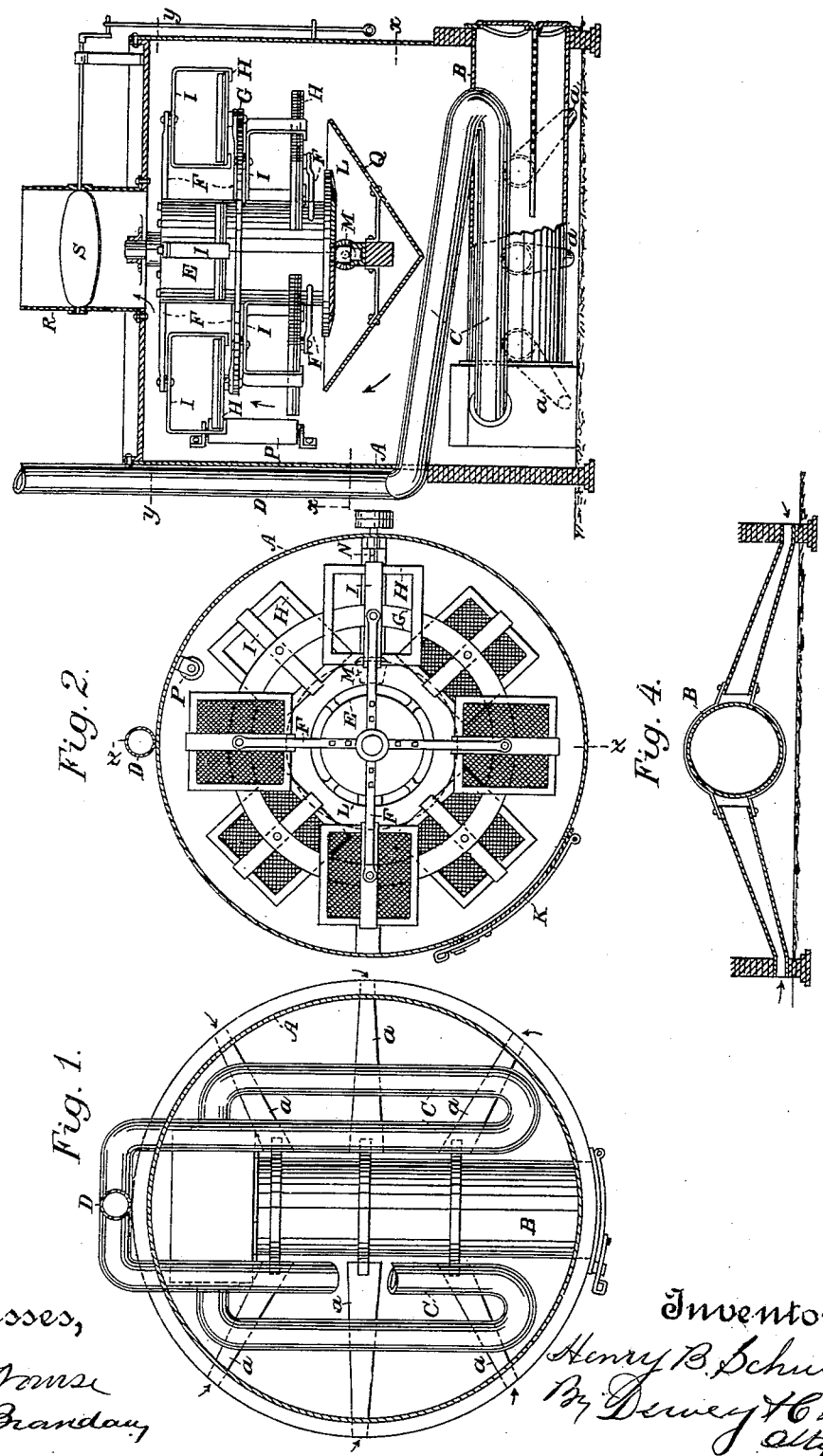
Witnesses,
Inventor,
Henry B. Schulte
By Dewey & Co.
Attys

UNITED STATES PATENT OFFICE.

HENRY B. SCHULTE, OF SAN JOSÉ, CALIFORNIA.

EVAPORATOR.

SPECIFICATION forming part of Letters Patent No. 616,638, dated December 27, 1898.

Application filed January 10, 1898. Serial No. 666,191. (No model.)

*To all whom it may concern:*

Be it known that I, HENRY B. SCHULTE, a citizen of the United States, residing at San José, county of Santa Clara, State of California, have invented an Improvement in Evaporators; and I hereby declare the following to be a full, clear, and exact description of the same.

My invention relates to an apparatus of the class known as "evaporators" or "driers," such as are used for desiccating various fruits and food products.

It consists in an arrangement of trays upon which the product to be dried is distributed, an inclosing exterior casing and means by which the latter is heated, a device by which the trays are carried horizontally around within the casing, a means for rotating the trays periodically upon vertical axes to change their position with relation to their source of heat, and in details of construction which will be more fully explained by reference to the accompanying drawings, in which—

Figure 1 is a plan on the line $xx$ of Fig. 3. Fig. 2 is a plan on the line $yy$ of Fig. 3. Fig. 3 is a vertical section on the line $zz$ of Fig. 2.

In the evaporation of fruits and vegetables and other delicate food products great difficulty is experienced in properly exposing the substances to be dried to the action of the heat, so that they will be equally and evenly affected and will not be over or under dried.

My invention is designed to overcome this difficulty.

It consists of an outer cylindrical casing A, made of any suitable or desired material and having any desired diameter and height, depending upon the amount of work to be done by it. Flues $a$ are suitably arranged for the admission of air from the outside, which is afterward heated and circulated within the apparatus. Within this casing is fixed a heater B, which may be of any well-known or suitable construction, having pipes C extending from it with a sufficient number of convolutions to utilize the heat before the pipes connect with the chimney D, through which the products of combustion eventually escape.

E is a shaft or drum journaled vertically and centrally within the exterior casing, having radial arms F projecting from it. These arms may, if preferred, have annular rings G fixed to the outer ends to form suitable supports for the trays to carry the products to be evaporated.

In the present case I have shown flat rectangular frames H, having dimensions approximately those of the fruit-trays, which are supported thereon. These tray-supports are suspended in yokes I, which are pivoted centrally at the top and bottom, so that they are turnable about these vertical pivots.

Any suitable or desired arrangement of the trays and their supports may be made. I have here shown them as being supported in horizontal planes successively one above the other and those of a different tier arranged to alternate with those of the tiers above and below.

The outer casing is provided with a door K of any desired description, either hinged or sliding horizontally or vertically, as may be desired, so that access can be had at any time to the interior without the loss of too much heat. Through these doors the trays are introduced, removed, and inspected. The central shaft E, by which they are carried, is rotated by any suitable arrangement of mechanism. I have here illustrated it with a gear-wheel L, driven by a pinion M upon a shaft N, which extends horizontally outward through the side of the casing and has a crank or other means O for applying power to rotate it.

Within the casing at a suitable point is a vertically-disposed stop, which in the present case is in the form of a roller P, journaled so as to stand in line with the trays in such a manner that as the central shaft is rotated and the trays and their carriers moved around the corners of these carriers will come in contact with the roller, and as they pass will turn about their suspending vertical axes, so as to change the position of the trays with relation to the interior at each revolution or oftener, if desired, by placing more than one of these intercepting rollers within the case. The object of this change of position is to expose every part of the tray to the heat, which may differ in different parts of the chamber, and thus provide for an equal drying of the contents without the danger of too much drying in one portion and too little in another. A considerable economy is also made in the amount of fuel required. By thus rotating the apparatus either at intervals or slowly and regularly every tray is brought into contact with this turning device, and all are continually turned at each rotation until the work is complete.

In order to equalize the heat throughout the chamber, I have shown a circular deflecting-plate Q, which is in the form of a flat upwardly-diverging cone, the center of which is at about the center of the apparatus, while the edges deflect the heat from the furnace outwardly and distribute it evenly throughout that portion of the drying-chamber in which the trays are carried.

In order to discharge the air and moisture from the drying-chamber and to regulate the heat therein, I have shown a central discharge-pipe R, which is provided with any suitable form of valve or damper S, which can be closed to retain the heated air within the chamber for any desired length of time and more or less opened to regulate its discharge therefrom.

Having thus described my invention, what I claim as new, and desire to secure by Letters Patent, is—

1. In an evaporator, a vertical cylindrical casing having a central revoluble shaft, supports extending radially from said shaft within the casing, tray-carriers journaled and revoluble upon vertical axes and means whereby said carriers are intermittently rotated.

2. In an evaporator or drier, a vertical cylindrical chamber, means for heating the same, a central revoluble shaft having radial arms fixed thereto, tray-carriers with yokes or suspending devices, and journals whereby they may be rotated about their vertical axes, a roller or stop with which the angles of the tray-carriers are adapted to contact as they pass, whereby they are partially rotated upon their axes.

3. In an evaporator or drier, a vertical, cylindrical casing, a central vertical shaft having radial arms, tray-supporters having yokes and vertical axes upon which they are journaled and turnable between the radial supports, a vertically-disposed stop or roller with which the angles of the trays contact as they are revolved, and mechanism by which the central shaft is rotated.

4. An evaporator or drier consisting of a vertical cylindrical chamber having a central rotatable vertical shaft with radial arms, tray-carriers with yokes having vertical journals supported from the radial arms and about which the tray-carriers are turnable, mechanism for rotating the central shaft whereby the trays are carried around within the interior of the chamber a stop or roller so disposed within the chamber that the angles of the trays contact therewith during their revolution whereby the trays are turned a quarter of a revolution upon their vertical axes with each revolution of the central shaft, a heater disposed within the lower part of the apparatus and a deflecting-plate diverging upwardly and outwardly from the center as described.

5. In an evaporating apparatus, a vertical cylindrical casing having a heating apparatus in the lower part, an upwardly and outwardly diverging deflector by which the heat is diverted to the outer portion within the casing, a vertically-journaled central shaft with mechanism by which it may be rotated, radial arms and supports at the ends thereof, tray-carriers having yokes with central vertical journals carried by the supports and about which they are turnable, a stop or vertically-journaled roller within the casing with which the angles of the trays contact during their revolution, whereby they are turned upon their own axes at each revolution, doors through which trays may be introduced and removed, and a central discharge-flue and damper whereby the rate of discharge is regulated.

In witness whereof I have hereunto set my hand.

HENRY B. SCHULTE.

Witnesses:
S. H. NOURSE,
JESSIE C. BRODIE.